Aug. 11, 1925.
H. B. MARVIN
AMPLIFYING SYSTEM
Filed Sept. 27, 1921
1,549,587
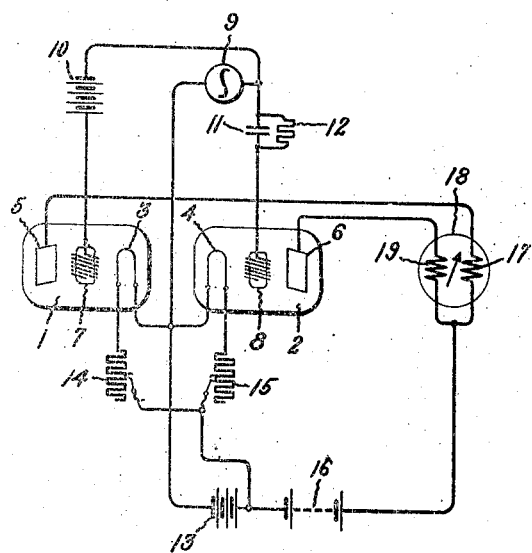
Inventor:
Harry B. Marvin,
by
His Attorney.

Patented Aug. 11, 1925.

1,549,587

UNITED STATES PATENT OFFICE.

HARRY B. MARVIN, OF SCHENECTADY, NEW YORK, ASSIGNOR TO GENERAL ELECTRIC COMPANY, A CORPORATION OF NEW YORK.

AMPLIFYING SYSTEM.

Application filed September 27, 1921. Serial No. 503,651.

*To all whom it may concern:*

Be it known that I, HARRY B. MARVIN, a citizen of the United States, residing at Schenectady, in the county of Schenectady, State of New York, have invented certain new and useful Improvements in Amplifying Systems, of which the following is a specification.

My present invention relates to apparatus for amplifying small alternating potentials or currents and producing an indication of the amplified effects.

One of the objects of my invention is to provide a simple and efficient apparatus for amplifying alternating currents or potentials which are of so small value as to be incapable of producing a satisfactory indication in ordinary indicating apparatus. The indicating apparatus employed with the amplified currents or potentials may be of any convenient type, the particular type employed being dependent upon the character of the indication which it is desired to produce. If it is desired to produce a steady indication, such, for example, as an indication of the voltage of a potential to be amplified an indicating instrument of the galvanometer type may be employed.

In carrying my invention into effect I employ two electron discharge amplifiers of the three-electrode type. The potentials or currents to be amplified are impressed upon the grid circuits of the amplifiers in such a way that the average current in the plate circuit of one device is increased when the potential of the gird is varied and the average current in the plate circuit of the other device is caused to decrease. The desired indication is then produced by an indicating instrument having two actuating coils which are included respectively in the two plate circuits and arranged in such a way that the indication produced varies with differences in the currents through the two coils.

The novel features which I believe to be characteristic of my invention are set forth with particularity in the appended claims, my invention itself, however, both as to its organization and method of operation will best be understood by reference to the following description taken in connection with the accompanying drawing in which I have indicated diagrammatically one way in which my invention may be carried into effect.

As indicated in the drawing, the amplifying system comprises two electron discharge devices 1 and 2 having the usual filamentary cathodes 3 and 4, anodes 5 and 6 and grids 7 and 8. The grid circuit of device 1 includes the source of alternating potential 9, which is to be amplified, and a battery 10 for adjusting the normal potential of the grid 7 to the proper value for securing the desired operation of the device 1. The grid circuit of device 2 includes the source of alternating potential or current 9 and a series condenser 11 shunted by the grid leak resistance 12. The battery 13 furnishes current for heating the cathodes 3 and 4, the regulation of the temperature of the two cathodes being effected in the usual way by means of variable resistances 14, 15. The plate circuit of device 1 includes a source of current 16 and the coil 17 of an indicating instrument 18, which may be the galvanometer type. The plate circuit of device 2 includes the source 16 and the coil 19 of instrument 18.

In the operation of the system shown, when an alternating potential from source 9 is impressed upon the grid circuits the average current in the grid circuit of the device 2 is caused to decrease. The battery 10 in the grid circuit of device 1 is adjusted to such a value that a positive potential impressed from source 9 upon the grid circuit of device 1 produces an appreciable increase in current, whereas a negative potential will produce substantially no decrease in current of the plate circuit of device 1. It is therefore apparent that the effect of impressing an alternating potential upon the two grid circuits is to produce an increase in the average current in the plate circuit of the device 1 and a decrease in the average current of the plate circuit of device 2. The coils 17 and 19 of the indicating instrument 18 are so arranged that the force exerted upon the moving element of the instrument by one coil is opposed to that exerted by the other coil. The devices 1 and 2 are so adjusted that there is either no resultant deflection of the instrument or that the deflection is of some fixed predetermined value. When an alternating potential is impressed upon the grid circuits of the two devices the resultant change in the deflection of the indicating instrument is due to the sum of the decrease of current in the device 2 and the increase of current in the device 1. By proper calibration of the instrument 18 the resulting deflection may be made to indicate on a suitable scale a measure of the potential impressed upon the grid circuits of the two devices from the source 9 or of the current by which this potential is produced.

While I have illustrated and described a preferred embodiment of my invention, it is apparent that my invention is by no means limited to the particular embodiment illustrated but that many modifications in the type and arrangement of the apparatus used and that the principle of operation involved may be utilized to furnish any desired sort of indication without departing from the scope of my invention as set forth in the appended claims.

What I claim as new and desire to secure by Letters Patent of the United States, is:—

1. Means for producing an indication of alternating potentials comprising a pair of electron discharge devices having plate and grid circuits associated therewith, means for applying the alternating potentials to be indicated to the grid circuits of said devices in such a way that the average current in the plate circuit of one device will decrease and the average current in the plate circuit of the other device will increase, and an indicating device associated with the plate circuits which is responsive to differences in the average currents in the two plate circuits.

2. Means for producing an indication of alternating potentials comprising a pair of electron discharge devices having plate and grid circuits associated therewith, a source of potential connected to the grid of one device for maintaining the grid of that device normally at a negative potential, a condenser shunted by a high resistance in the grid circuit of the other device, means for applying the potentials to be indicated to the grid circuits of said devices and an indicating device connected differentially to the plate circuits of the two devices.

3. Means for producing an indication of alternating potentials comprising a pair of electron discharge devices having plate and grid circuits associated therewith, means for applying the alternating potentials to be indicated to the grid circuits of said devices in such a way that the average current in the plate circuit of one device will decrease and the average current in the plate circuit of the other device will increase and an indicating device connected differentially to the plate circuits of the two devices.

4. Means for producing an indication of alternating potentials comprising a pair of electron discharge devices having plate and grid circuits associated therewith, a source of potential connected to the grid of one device for maintaining the grid of that device normally at a desired negative potential, a condenser shunted by a high resistance in the grid circuit of the other device, means for applying the potentials to be indicated to a common portion of the grid circuits of said devices and an indicating device connected differentially to the plate circuits of the two devices.

In witness whereof, I have hereunto set my hand this 26th day of September, 1921.

HARRY B. MARVIN.